April 29, 1958     J. B. ALEXANDER     2,832,201
DUAL ENGINE YOKE
Filed June 22, 1956
FIG. 1.
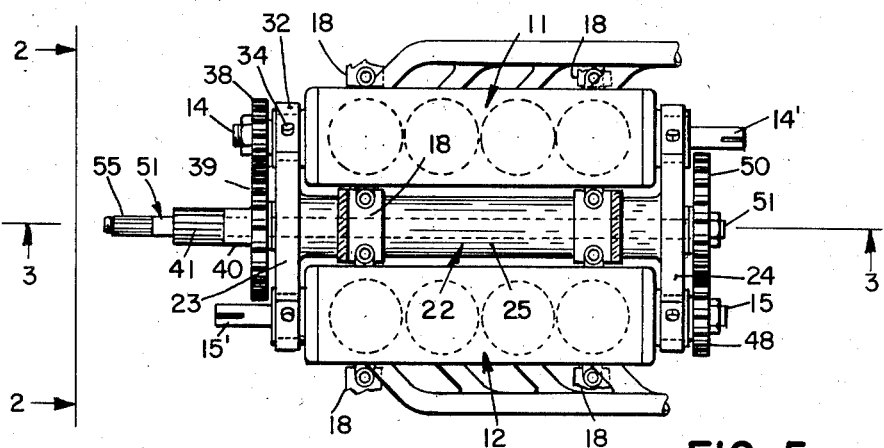
FIG. 2.
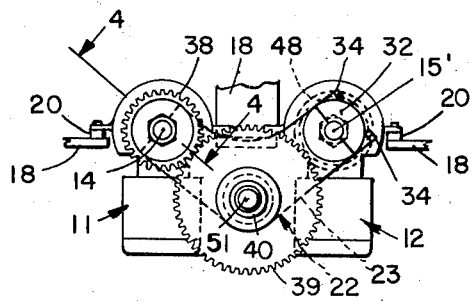
FIG. 5.
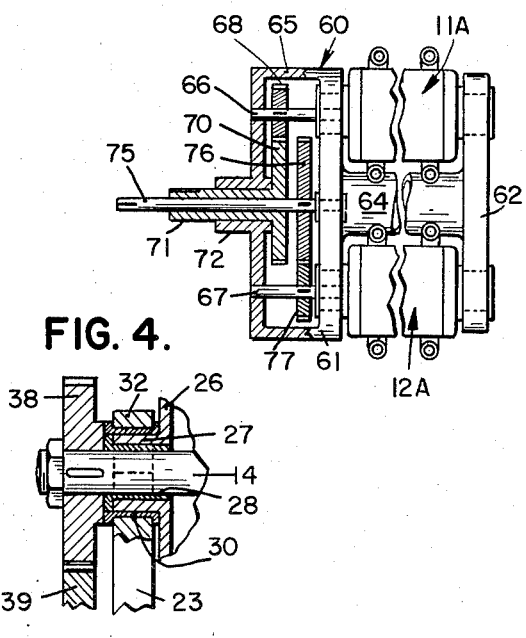
FIG. 4.
FIG. 3.
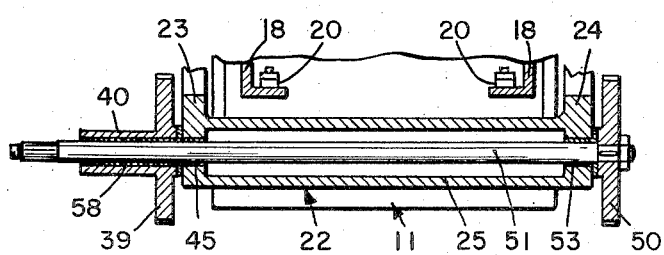
INVENTOR
JESSE B. ALEXANDER
BY
Mason & Graham
ATTORNEYS

United States Patent Office 2,832,201
Patented Apr. 29, 1958

2,832,201

DUAL ENGINE YOKE

Jesse B. Alexander, Anaheim, Calif.

Application June 22, 1956, Serial No. 593,194

10 Claims. (Cl. 60—97)

This invention has to do with means for mounting and connecting two internal combustion engines or other type engines for the purpose of driving a single drive shaft or two drive shafts having a common axis.

There are many instances where it is desirable to be able to connect two internal combustion engines in a side-by-side or above-below relation for the purpose of driving a single shaft or for the purpose of driving two shafts having a common axis of rotation. One example is in the use of two motors in a light or small airplane.

Government regulations place many limitations upon the use of single-engine airplanes. For example, such aircraft cannot be operated for hire or reward over rough terrain, heavily populated areas, at night, or on instruments. The regulations require that for operation under such conditions (and certain other conditions) the aircraft must be a multi-engine airplane in which either engine can operate independently of the other. It is therefore highly desirable to be able to mount two engines in small aircraft originally designed for a single engine, but so far as I know this has presented so many difficulties that, heretofore, it has not been feasible.

It is, therefore, an object of my invention to provide novel practicable means for mounting two engines in the fuselage of what is normally a single engine aircraft and novel means for connecting these engines to drive two independent propeller shafts.

It is a particular object of the invention to provide novel means for mounting and connecting a pair of internal combustion engines, or other type engines, which permits the engines to be independently shock mounted in a conventional manner on a frame and yet serves to connect the engines to maintain gear alignment of the engines with the drive train of gears.

Another object is to provide a novel and improved yoke means for connecting two engines which serves to hold the crank shafts of the engines in parallel alignment and yet permits the engines to vibrate or rock about the axes of their respective crank shafts to the extent permitted by the engine mounting means.

These and other objects will be apparent from the drawing and the following description.

Referring to the drawing,

Fig. 1 is a plan view showing two in-line internal combustion engines and means embodying the invention connecting these engines and providing a pair of concentrically disposed, independently driven propeller shafts;

Fig. 2 is a front elevational view in the direction of the line 2—2 of Fig. 1 of the engine assembly of Fig. 1;

Fig. 3 is a sectional view on line 3—3 of Fig. 1;

Fig. 4 is an enlarged fragmentary sectional view on line 4—4 of Fig. 2; and

Fig. 5 is a fragmentary sectional view showing a modified form of yoke and gearing.

More particularly describing the invention, numerals 11 and 12 generally indicate a pair of in-line internal combustion engines. In Figs. 1 and 2 these engines are assumed to be mounted as facing in opposite directions, that is, the main drive end of the crank shaft of engine 11 is at the left-hand side of the figure, being designated 14, while the main drive end of the crank shaft of engine 12 is at the right-hand side of the figure, being designated 15. The opposite ends of these crank shafts are designated 14' and 15' and would normally serve to drive accessories (not shown).

The engines are shown inverted, but this is not essential, since they may be upright or even might be mounted one above the other. It is contemplated that the two engines are each individually mounted upon the frame structure or other support, designated 18, by means of some conventional shock-absorbing or cushion mounting means 20 which permits limited movement of the engines relative to the frame or support in response to vibration set up by operation of the engines.

For the purpose of connecting the engines, I provide a yoke assembly designated generally by numeral 22. This comprises a forward yoke 23, a rear yoke 24, and a connecting member 25.

The engines are journaled at each end in the yokes and for this purpose the crank case 26 of each motor is shown provided with a tubular extension or trunnion 27 through which the crank shaft projects, crank shaft 14 being illustrated in Fig. 4. The crank shaft may be journaled in the trunnion 27 as by a suitable bushing 28. The trunnion is shown provided with a sleeve 30 about which the yoke is mounted, the end of each yoke being provided with a cap 32 which is secured to the main body 23 of the yoke by cap screws 34 in a conventional manner. It is to be understood that the trunnions 27 may rotate within the yokes.

It will be apparent from the construction described that the two engines are each journaled in the yokes in a manner such that they may pivot or rotate about the axes of their respective crank shafts in response to vibrations set up by operation of the engines or other sources to the extent permitted by the vibration absorbing mounts 20. Thus alignment of the crank shafts of the engines is maintained.

In the embodiment shown in Figs. 1–4, the crank shaft 14 is shown provided with a pinion 38 keyed to the shaft and meshing with a gear 39 which is integral with a propeller shaft 40 having a splined portion 41 upon which a propeller can be mounted. The shaft 40 is journaled in a suitable bearing 43 mounted in a centrally disposed opening 45 in the forward yoke 23.

Engine 12 is provided with a pinion 48 on its crank shaft 15 which meshes with a gear 50 secured upon a propeller shaft 51. The latter is journaled in the yoke 24 by the bearing 53 and extends through the connecting member 25, which is hollow and preferably tubular, and through yoke 23 and the propeller shaft 40. Shaft 51 extends beyond shaft 40 and carries a splined portion 55 for the mounting of a second propeller. The shaft 51 is also journaled within shaft 40 by the bearing 58. The above construction provides two, independently driven propeller shafts, either of which can function in the event of failure of the engine driving the other.

Referring now to Figure 5, I show a modified form of arrangement for the purpose where it is desired to mount two engines each of which has its crank shaft projecting from the same end. In this form of the invention the yoke assembly, designated 60, includes a forward section 61 and a rear section 62, the two sections being connected by a tubular member 64. The yoke sections are mounted upon the ends of the engines 11a and 12a in the same manner as the yoke assembly previously described. In this form of the invention, however, the forward yoke 61 is formed to provide a gear housing or case 65 which serves to journal the outer end portions of crank shafts 66 and 67 of the engines, respectively. Crank shaft 66 carries a pinion 68 which meshes with a gear 70 having a short shaft section 71. The latter is journaled within a hub 72 of the gear case. An inner shaft 75 is journaled within shaft 71 and within yoke section 61. This shaft 75 carries a gear 76 which is driven by crank shaft 67 through the medium of pinion 77.

It will be apparent that the form of the invention just described also serves to provide a construction wherein two motors or engines can be independently shock mounted and yet have their crank shafts maintained in alignment for the purpose of driving a multiplicity of crank shafts.

While I have shown particular forms of gearing for the purpose of enabling the two engines to independently drive two separate, concentric shafts, this has merely been for the purpose of illustration since I do not intend thereby to be limited to any particular gearing means. Primarily the purpose of the invention is the provision of means for yoking two independently shock-mounted engines in such a manner that they may vibrate on their mounts independently of each other and yet be maintained in alignment in so far as their crank shafts or output shafts are concerned, whereby whatever gear train is employed the gears and crank shafts are maintained in proper alignment. Also, while I have shown the engines driving two independent shafts such as would be desirable for installation in an airplane where each engine and shaft should be independent of the other, I contemplate that where this is not essential, the same yoke means may be used and any suitable or conventional type of gearing employed for the purpose of driving only a single shaft or even a multiplicity of shafts.

I thus contemplate that various changes and modifications can be made in the exemplifications of the invention shown without departing from the scope of the invention which is indicated by the claims which follow.

I claim:

1. In a dual engine drive means, a support, a pair of engines disposed with their output shafts in parallel relation, means independently mounting said engines on said support, a yoke assembly connecting said engines, said yoke assembly including a yoke at each end of said pair of engines and a member substantially rigidly connecting said yokes, and means journalling each engine in each yoke about the axis of the output shaft of the engine.

2. In a dual engine drive means, a support, a pair of engines disposed with their output shafts in parallel relation, means independently mounting said engines on said support, a yoke assembly connecting said engines, said yoke assembly including a yoke at each end of said pair of engines and a member substantially rigidly connecting said yokes, means journalling each engine in each yoke about the axis of the output shaft of the engine, a drive shaft journalled in one of said yokes, and gear means operatively connecting one engine to said drive shaft.

3. In a dual engine drive means, a support, a pair of engines disposed with their output shafts in parallel relation, means independently mounting said engines on said support, a yoke assembly connecting said engines, said yoke assembly including a yoke at each end of said pair of engines and a member substantially rigidly connecting said yokes, means journalling each engine in each yoke about the axis of the output shaft of the engine, a drive shaft journalled in one of said yokes, gear means operatively connecting one engine to said drive shaft, a second drive shaft journalled in one of said yokes, and gear means operatively connecting the other engine to said second drive shaft.

4. A dual engine drive means as set forth in claim 3 in which said drive shafts have a common axis.

5. A dual engine drive means as set forth in claim 3 in which said second drive shaft extends through both yokes and in which the gear means for said first drive shaft is at one end of said pair of engines and in which the gear means for said second drive shaft is at the other end of said pair of engines.

6. A yoke assembly for operatively connecting a pair of engines or the like disposed with their output shafts in parallelism, comprising a pair of yokes, a member extending between and connecting said yokes, and means on each yoke for journalling the engines therein.

7. A yoke assembly for connecting a pair of engines disposed parallel to each other, comprising a pair of V-shaped yokes, a rigid connecting member extending between and connected to said yokes in the region of the juncture of the legs of the yokes, said yokes extending normal to said connecting member, and means at the upper end of each leg of each yoke for journalling an engine therein.

8. In a dual engine drive means, a support, a pair of engines disposed with their output shafts in parallel relation, means independently mounting said engines on said support, a trunnion at each end of each of said engines, said trunnion of each engine being concentric about the same axis as the crankshaft of the engine, a yoke at each end of said pair of engines, said yokes receiving and journalling the trunnions of said engines, and a member rigidly connecting said yokes.

9. A dual engine drive means as set forth in claim 8 in which said yokes are V-shaped and in which said member connecting the yokes extends between the region of the juncture of the legs of the yokes, and in which said trunnions are received adjacent the ends of the legs of the yokes.

10. A dual engine drive means as set forth in claim 8 in which said yokes support a pair of concentric propeller shafts having gear means adapted to be driven by the crankshafts of the engines, respectively.

References Cited in the file of this patent

UNITED STATES PATENTS 968,127     Cloud _____ Aug. 23, 1910